United States Patent [19]

Hudson

[11] Patent Number: 5,075,028
[45] Date of Patent: Dec. 24, 1991

[54] ACCELERATOR COMPOSITIONS

[75] Inventor: John C. Hudson, Baton Rouge, La.

[73] Assignee: Copolymer Rubber & Chemical Corp., Baton Rouge, La.

[21] Appl. No.: 435,770

[22] Filed: Nov. 13, 1989

[51] Int. Cl.$^5$ ................................. C09K 3/00
[52] U.S. Cl. .................. 252/182.14; 252/182.13; 252/182.17
[58] Field of Search ............. 252/182.13, 182.14, 252/182.17

[56] References Cited

U.S. PATENT DOCUMENTS

| | | | |
|---|---|---|---|
| 3,624,058 | 11/1971 | Jorgensen | 524/561 |
| 4,098,670 | 7/1978 | Custer et al. | 204/252 |
| 4,116,785 | 9/1978 | Cheng | 528/168 |
| 4,169,820 | 10/1979 | Bock et al. | 524/425 |
| 4,197,381 | 4/1980 | Alia | 264/174 |
| 4,248,985 | 2/1981 | Ohishi et al. | 525/349 |
| 4,258,105 | 3/1981 | Williams | 525/519 |
| 4,271,049 | 6/1981 | Coran et al. | 525/232 |
| 4,397,987 | 8/1983 | Cornell | 525/75 |
| 4,670,057 | 6/1987 | Oezelli et al. | 106/236 |
| 4,755,320 | 7/1988 | Cohen et al. | 252/182.17 |
| 4,861,833 | 8/1989 | Chasser et al. | 525/118 |
| 4,870,113 | 9/1989 | Mueller et al. | 264/54 |

*Primary Examiner*—Edward A. Miller
*Attorney, Agent, or Firm*—Rockey and Rifkin

[57] ABSTRACT

An accelerator composition and a rubber compounding composition in which a rubber is blended with a combination of three accelerators and sulfur for curing the rubber while minimizing the formation of iridescent sheen. The combination of accelerators included a thiolated morpholine, a dithiocarbamate and a benzothiazole.

1 Claim, No Drawings

ACCELERATOR COMPOSITIONS

This invention relates to improved rubber compounding compositions, and more particularly to rubber compounding compositions containing a unique combination of accelerators to minimize iridescent sheen and to an improved crosslinking system.

BACKGROUND OF THE INVENTION

As is now well known to those skilled in the art, extruded and molded rubber compositions have been widely used in a variety of applications, particularly in the automotive field, for gaskets, seals, hoses, grommets, tubing, rub strips and bumpers. One type of rubber which has enjoyed considerable success in those applications due to its favorable processing characteristics and vulcanizate properties has been the so-called ethylene-propylene-diene monomer terpolymer rubbers or EPDM rubbers. Those rubbers are well known to those skilled in the art, and are formed by interpolymerization of ethylene, one or more mono-olefins containing 3-16 carbon atoms, and preferably propylene, and one or more polyenes containing a plurality of carbon-to-carbon double bonds Preferred as the diene monomer in such EPDM rubbers are the open chain polyunsaturated hydrocarbon containing 4-20 carbon atoms such as 1,4-hexadiene. Even more preferred are the monocyclic and polycyclic polyenes, and preferably polyunsaturated bridged ring hydrocarbons or halogen substituted bridged ring hydrocarbons. Examples of the latter include the polyunsaturated derivatives of bicyclo-(2,2,1)-heptane wherein at least one double bond is present in one of the bridged rings, such as bicyclopentadiene, bicyclo-(2,2,1)-hepta-2,5-diene, the alkylidene norbornenes, and especially the 5-alkylidene-2-norbornenes wherein the alkylidene group contains 1-20 carbon atoms and preferably 1-8 carbon atoms, and the alkenyl norbornene, and especially the 5,alkenyl-2-norbornenes wherein the alkenyl group contains about 3-20 carbon atoms and preferably 3-10 carbon atoms. Other bridged ring hydrocarbons suitable for use as the diene monomer include polyunsaturated derivatives of bicyclo-(2,2,2)-octane such as bicyclo-(3,2,1)-octane, polyunsaturated derivatives of bicyclo-(3,3,1)-nonane and polyunsaturated derivatives of bicyclo-(3,2,2)-nonane.

Specific examples of preferred bridge ring compounds include 5-methylene-2-norbornene, 5-ethylidene-2-norbornene, 5-n-propylidene-2-norbornene, dicyclopentadiene and the methylbutanyl norbornenes such as 5-(2-methyl-2-butanyl)-2-norbornene, 5-(3-methyl-2-butanyl)-norbornene and 5-(3,5-dimethyl-4-hexanyl)-2-norbornene.

A number of such EPDM rubbers are commercially available from Copolymer Rubber and Chemical Corporation under the trademark "EPsyn ®".

For the end uses cited above, fabrication is not complete until the rubber article has been vulcanized or cured to enhance mechanical strength and stability necessary for prolonged usage.

The side chain unsaturation of EPDM provides for curing by a variety of mechanisms including peroxide, sulfur, and resins. The choice of vulcanizing system is important since it affects stress-strain properties of the final vulcanizate as well as heat resistance and compression set. Resin crosslinking systems are employed for EPDM when improved heat resistance is required and when the EPDM is formulated in combination with other rubbers which cannot be crosslinked with sulfur or peroxide. Peroxide systems often are not employed with EPDM due to odor problems and requirements for special vulcanization techniques, for example, hot air cures cannot be utilized with peroxide systems. Formulations requiring high levels, greater than twenty percent of naphthenic or paraffinic processing oils and carbon black are also slow to cure even with high levels of peroxide. Sulfur crosslinking systems are used more broadly with EPDM since no special techniques or processing equipment is required for formulating, extruding or molding, and vulcanization. By adjusting the level of unsaturation in the base EPDM, sulfur systems can very economically and effectively be used to control the degree of cure in the fabricated article, without concern of crosslinking during extrusion or molding. By proper choice of the accelerator, very rapid vulcanization cycles can be achieved.

A typical vulcanization recipe for a sulfur cure system would include (1) an activator, commonly metal oxides such as zinc oxide, magnesium oxide, manganese oxide, and fatty acids such as stearic acid used in conjunction with the metal oxide if an organic accelerator is used, (2) sulfur or a sulfur masterbatch, and (3) an accelerator, needed in order to produce a specific degree of cure in a practical time for commercial use.

In the formulation of EPDM for applications of interest here, it is generally necessary to incorporate carbon black and plasticizers or processing oils. The carbon black is used as a reinforcing agent and to provide stability against detrimental radiation and ozone. Processing oil reduces the effective viscosity of the blend so that high Mooney viscosity, more economical and readily available types of EPDM rubber can be used.

In applications where a carbon black formulation is used, an iridescent sheen has been observed on dense and cellular extruded and dense molded parts both prior to and after vulcanization. The sheen is a surface phenomenon which exhibits visual colors of gold, greens and blues. The greater the surface area of the extruded or molded part the more intense the condition of iridescent sheen. Even though the sheen does not seem to affect the physical properties of the vulcanizate, its chromatic appearance has been found objectionable by the automotive industry. Broader use of EPDM in many automotive applications is hindered by the oil on water appearance associated with the iridescent sheen phenomenon. Color coding of the various automotive parts is of particular concern to today's automotive design engineers. Black parts would be specified more often if the quality of the black surface could be made compatible with the other colors.

The iridescent sheen phenomenon occurs particularly with exposure of the fabricated article to ultraviolet light (normal fluorescent light has a sufficient UV intensity to activate the sheen) and ozone. It has been determined that the appearance of the sheen can be accelerated by placing a sample of the molded or extruded part in an ozone chamber with an ozone concentration level of 50 pphm for four hours.

In studying the phenomena of iridescent sheen numerous phases of the fabrication process were examined including formulations, methods of compounding, conditions of extrusion or molding, and methods and conditions of curing. It had been recognized previously that components of the formulation and more typically the sulfur and plasticizers would bloom; migrate to the surface of a molded or extruded part. Much of the compounding literature teaches ways in which sulfur bloom can be minimized by proper choice of sulfur, for example, reduced use of sulfur by incorporation of organic sulfur vulcanizing agents. The iridescent sheen observed here is a problem distinguished from that of sulfur bloom and usually both are not observed with the same formulation. However, working with a hypothesis that the sheen was a result of some component or components bleeding to the surface of the rubber part, laboratory investigators have revealed that the sheen phenomenon could be washed out or extracted with certain solvent. The extraction solvents were then analyzed to contain components of the accelerators and plasticizer systems.

It is accordingly an object of the present invention to provide a rubber compounding composition which overcomes the foregoing disadvantages under conditions commonly practiced in manufacture, storage and end use of articles.

It is a more specific object of the present invention to provide a crosslinking system where levels of the components can be increased or decreased without developing the iridescent sheen thereby permitting the user to modify the rate of cure to fit the processing needs during forming and vulcanization.

It is a more specific object of the present invention to provide a rubber compounding and rubber curing composition which avoids the formation of iridescent sheen.

It is yet another object of the present invention to provide a rubber compounding composition containing a unique combination of accelerators to minimize the formation of iridescent sheen.

These and other objects and advantages of the invention will become more apparent hereinafter.

BRIEF DESCRIPTION OF THE INVENTION

The concepts of the present invention reside in a rubber composition which has been formulated to include a specific curing or crosslinking system which have been found to reduce the appearance of the sheen phenomenon and the accelerator composition used in curing such rubbers. It has been found that the sheen phenomenon can be substantially reduced or minimized where the EPDM rubber formulation is formulated to include a combination of accelerators containing, as one essential ingredient, a thiolated morpholine. In the preferred practice of the present invention, the thiolated morpholine is used in combination with a dithiocarbamate accelerator and a benzothiazole accelerator. It has been found that the specific combination of accelerators, when employed with spider sulfur as the vulcanizing agent, coact together to prevent or minimize the sheen phenomenon which has been observed in the cross-linking of EPDM rubber.

A further improvement can be realized when the fatty acid (commonly stearic acid) component in the activator is substituted with polyethylene glycol or a combination of polyethylene glycol and an alkyl phenol formaldehyde resin. The amount of polyethylene glycol employed can be 0.5 to 6.0 parts per 100 parts of rubber (with 2 parts per 100 parts preferred) and likewise when the combination of glycol and resin is employed both are used at a level of 0.5 to 6.0 parts per 100 parts rubber (and 2 parts each per 100 parts rubber being preferred).

The amount of the accelerators to be employed in the practice of the present invention varies, depending upon the cross-linked density desired in the final product. Typically, each one of the accelerators is used in an amount within the range of 0.1 to 3 parts by weight per hundred parts by weight of rubber.

DETAILED DESCRIPTION OF THE INVENTION

The concepts of the present invention have been found to be most applicable to the EPDM rubbers as described above which are formulated with one or more of the conventional additives of carbon black, antioxidants, fillers and plasticizers (processing or extender oils). It has also been found that the specific combination of accelerators can also be used to eliminate or substantially minimize the sheen phenomenon which has been observed in carbon black formulations with conventional acrylonitrile-butadiene rubbers (NBR) and styrene-butadiene rubbers (SBR). The preferred rubber, however, is an EPDM rubber of the type described above, where high accelerator levels must be employed to compensate for the low level of unsaturation in the rubber compared to NBR and SBR.

As is well known to those skilled in the art, such EPDM rubbers contain chemically bound molar ratios of ethylene to propylene (or other $C_3$ to $C_6$ mono-olefins) varying from 95:10 to 5:90 as the ratio of moles of ethylene to moles of propylene and preferably 70:30 to 55:55 as the molar ratio of ethylene to propylene. The polyene or substituted polyene in such EPDM rubbers is chemically bound in an amount within the range of 0.1 to 10 mole percent. The level of unsaturation of the backbone rubber may range from 0 to 20 double bonds per 1000 carbon atoms in the polymer chain.

The accelerator employed in the practice of the present invention are individually known, and, without limiting the present invention as to theory, it is believed that the effectiveness of the present invention arises from the combination of accelerators. In the preferred practice of the present invention, one important accelerator is a thiolated morpholine. As used herein, the term thiolated morpholine refers to a morpholine group which is bonded to another heterocyclic group, and preferably another morpholine group through a -S-S- bond.

In the preferred practice of the invention, use is made of 4,4'-dithiobismorpholine (commercially available under the trademark "Vanax A ®") which has the structure:

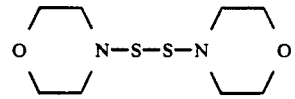

The dithiobismorpholine can also be considered as a vulcanizing agent since it serves as a sulfur donor. It is favored for recipes where low elemental sulfur is necessary and excellent heat aging properties are needed in the final vulcanizate. The morpholine accelerator is used in combination with spider brand sulfur, and two other accelerators, a dithiocarbamate accelerator and a benzothiazole accelerator.

Vanax A ®, Bismate ® and Altax ® are registered trademarks of the R. T. Vanderbilt company, Inc., Norwalk, Connecticut.

The Spider Brand sulfur vulcanizing agent can be any of a number of commercially available elemental sulfur-containing vulcanizing agents. The dithiocarbamate accelerator is preferably a carbamate salt of bismuth and preferably a dithiocarbamate bismuth salt. Preferred for practice in the present invention is bismuth dimethyldithiocarbamate which is commercially available under the trademark "Bismate ®". Bismate is particularly effective as an ultra accelerator and is preferred for applications where vulcanization temperatures in excess of 160° C. are used.

As the benzothiazole accelerator, use is preferably made of a bis(2,2'-benzothiazole)disulfide. The latter accelerator, also commonly referred to as MBTS, is commercially available under the trademark "Alta ®".

No particular preparation techniques or processing steps, apart from those conventionally employed in the formulation of rubber compounding compositions, need be employed. It is sufficient that fabricators of the finished goods simply employ the curing system of this invention by administering the curing system with the rubber compound in an internal mixer, mill, extruder or like conventional techniques.

Having described the basic concepts of the present invention, reference is now made to the following examples which are provided by way of illustration and not by way of limitation of the practice of the invention.

EXAMPLE 1

This example illustrates the formulation of an EPDM molding composition utilizing the accelerator system of the present invention. Two separate EPDM polymers, marketed by Copolymer Rubber and Chemical Corporation, which had been extended with high levels of carbon black, non-black filler and plasticizer were used as a control recipe, a typical standard compound found in dense automotive extrusions. Ingredients of the formulation include an activator, stearic acid and zinc oxide, and calcium carbonate as an inorganic filler. The composition is as follows:

| Component | Parts By Wt. |
| --- | --- |
| EPDM rubber (EPsyn 5508) | 55 |
| EPDM rubber (EPsyn 6906) | 45 |
| Calcium Carbonate | 20 |
| Carbon Black (N650 Black) | 150 |
| Carbon Black (N762 Black) | 85 |
| Naphthenic Oil (Flexon 680) | 158 |
| Activator - Zinc Oxide | 6 |
| Stearic Acid | 1.5 |
| Sulfur (Spider Brand Sulfur) | 1.0 |
| The accelerator composition was formulated as follows: | |
| Accelerator | |
| Benzothiazyl disulfide (Altax) | 1.5 |
| Bismuth dimethyl dithiocarbamate (Bismate) | 0.6 |
| Dithiodimorpholine (Vanax A) | 1.5 |

The total batch was mixed in a BR laboratory Banbury mixer in which the composition was masticated using the up-side-down mixing cycle. The stock was discharged from the machine when reaching a dump temperature of 250° F.

The composition is extruded through a Haake-Buchler Rheomix 600 using a flat die; extrudates were made in lengths of 12 inches. Duplicate samples were placed in an air circulating oven for six minutes at 400° F. Tensile sheets 6×6" and plied compression set sheets were compression molded for five minutes at 350° F. Stress-strain properties, aging properties and compression set valuations were obtained from cured set specimens and slit extrusions.

To hasten the appearance of iridescent sheen, samples were placed into an Orec 0600-C ozone chamber with a concentration setting of 50 pphm for four hours. The criteria for good and bad surface appearance is observation since non-iridescent sheen is an aesthetic phenomenon and need not be measured. A surface free of iridescent sheen is normally black or shiny black whereas iridescent sheen exhibits very pronounced colors of blues, greens and golds.

The extruded parts cured with the accelerator systems of the present invention were free of iridescent sheen after four hours in the ozone chamber. By way of comparison, the following accelerator system, typical of those used with EPDM rubbers, was employed under the same conditions:

| Accelerator | Parts By Wt. |
| --- | --- |
| Benzothiazyldisulfide (Altax) | 1.50 |
| Tetramethylthiuramdisulfide (Methyl Tuads ®) | 0.80 |
| Copper dimethyldithiocarbamate (Cumate ®) | 0.27 |
| Zinc dibutyldithiocarbamate (Butyl Zimate ®) | 2.0 |
| Sulfur (Spider Brand Sulfur) | 1.80 |

After four hours in the ozone chamber, the control recipe exhibited pronounced iridescent sheen.

It will be apparent from the foregoing that the present invention provides a significantly improved reduction in iridescent sheen, and thus provides molded and extruded products having significantly improved aesthetic characteristics.

EXAMPLE 2

This example demonstrates that a further improvement can be realized by substituting the fatty acid component in the activator with a higher molecular weight polar organic polymer. The stearic acid as used in Example 1 was shown to migrate to the surface and was part of the "blooming complex" extracted from the rubber article. The following two formulations were tested as in Example 1. Recipe A substituted 2 parts of a low molecular weight polyethylene glycol (a non-blooming organic lubricant) for 1.5 parts of stearic acid.

| Improved Recipe A | |
| --- | --- |
| | Parts By Wt. |
| Component | |
| EPsyn 5508 | 55 |
| EPsyn 6906 | 45 |
| Calcium Carbonate | 20 |
| N650 Black | 150 |
| N762 Black | 85 |
| Naphthenic Oil | 160 |
| Zinc Oxide | 6 |
| Polyethylene Glycol (P.E.G. 3350) | 2 |
| Sulfur (Spider Brand Sulfur) | 1.0 |
| Accelerators | |
| Benzothiazyl disulfide (Altax) | 1.5 |
| Bismuth Dimethyl Dithiocarbamate (Bismate) | 0.6 |
| Dithiobismorpholine (Vanax A) | 1.5 |

| Improved Recipe B | |
| --- | --- |
| | Parts By Wt. |
| Component | |
| EPsyn 5508 | 55 |
| EPsyn 6906 | 45 |
| Calcium Carbonate | 20 |
| N650 Black | 150 |
| N762 Black | 85 |

| -continued | |
|---|---|
| Improved Recipe B | |
| | Parts By Wt. |
| Naphthenic Oil | 160 |
| Zinc Oxide | 6 |
| Polyethylene Glycol (P.E.G. 3350) | 2 |
| Alkyl phenol formaldehyde resin (SP-1068) | 2 |
| Sulfur (Spider Brand Sulfur) | 1.0 |
| Accelerators | |
| Benzothiazyl disulfide (Altax) | 1.5 |
| Bismuth Dimethyl Dithiocarbamate (Bismate) | 0.6 |
| Dithiobismorpholine (Vanax A) | 1.5 |

Recipe B above illustrates a further improvement when two parts each of the polyethylene glycol and alkyl phenol formaldehyde resin are used instead of 1.5 parts stearic acid. The resin enhances the total cure thereby reducing the tendency for bloom.

I claim:

1. An accelerator composition for use in the curing of rubbers without the formation of an iridescent sheen comprising bis(2,2'-benzothiazole)disulfide, bismuth dimethyldithiocarbamate and dithiodimorpholine.

* * * * *